(12) United States Patent
Wybenga et al.

(10) Patent No.: US 7,672,302 B2
(45) Date of Patent: Mar. 2, 2010

(54) ROUTER USING SWITCHING-BEFORE-ROUTING PACKET PROCESSING AND METHOD OF OPERATION

(75) Inventors: Jack C. Wybenga, Plano, TX (US); Patricia Kay Sturm, McKinney, TX (US); Gary Russell Chesnut, Granbury, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1347 days.

(21) Appl. No.: 10/720,898

(22) Filed: Nov. 21, 2003

(65) Prior Publication Data

US 2005/0111445 A1 May 26, 2005

(51) Int. Cl.
*H04L 12/28* (2006.01)
(52) U.S. Cl. .................................. 370/389; 370/401
(58) Field of Classification Search ................. 370/401, 370/465, 351, 352, 461, 462, 444, 389, 469, 370/392, 395.3; 375/346; 709/238, 245; 713/201; 718/100
See application file for complete search history.

(56) References Cited

U.S. PATENT DOCUMENTS

| | | | |
|---|---|---|---|
| 6,078,963 A * | 6/2000 | Civanlar et al. .............. 709/238 |
| 6,097,772 A * | 8/2000 | Johnson et al. .............. 375/346 |
| 6,157,644 A * | 12/2000 | Bernstein et al. ............ 370/392 |
| 6,259,699 B1 * | 7/2001 | Opalka et al. ................ 370/398 |
| 6,735,198 B1 * | 5/2004 | Edsall et al. ................. 370/389 |
| 6,876,654 B1 * | 4/2005 | Hegde ......................... 370/392 |
| 7,474,660 B1 * | 1/2009 | Pearce et al. ............. 370/395.3 |
| 2002/0116527 A1 * | 8/2002 | Chen et al. ................... 709/245 |
| 2002/0118682 A1 * | 8/2002 | Choe ...................... 370/395.31 |
| 2003/0067925 A1 * | 4/2003 | Choe et al. ................... 370/400 |
| 2003/0067929 A1 * | 4/2003 | Matsuzawa .................. 370/401 |
| 2003/0084219 A1 * | 5/2003 | Yao et al. ..................... 710/300 |
| 2003/0145106 A1 * | 7/2003 | Brown ......................... 709/238 |
| 2003/0161319 A1 * | 8/2003 | Okagawa et al. ......... 370/395.4 |
| 2003/0210686 A1 * | 11/2003 | Terrell et al. ................. 370/389 |
| 2004/0111640 A1 * | 6/2004 | Baum .......................... 713/201 |
| 2004/0156371 A1 * | 8/2004 | Kumar et al. ................ 370/401 |
| 2004/0187112 A1 * | 9/2004 | Potter, Jr. .................... 718/100 |
| 2004/0240470 A1 * | 12/2004 | Medved et al. .............. 370/469 |

* cited by examiner

*Primary Examiner*—Kwang B Yao
*Assistant Examiner*—Syed Bokhari

(57) ABSTRACT

A router comprising: i) a switch fabric; and ii) N Layer 2 modules coupled by the switch fabric, each of the N Layer 2 modules capable of receiving data packets in Layer 2 frames and forwarding the received data packets using Layer 2 addresses associated with the Layer 2 frames, wherein a first one of the Layer 2 modules comprises a Layer 3 routing engine capable of forwarding a first received data packet through the switch fabric directly to a second one of the Layer 2 modules using a Layer 3 address associated with the first received data packet if the first Layer 2 module does not recognize a Layer 2 address associated with the first received data packet.

21 Claims, 3 Drawing Sheets

ROUTER USING SWITCHING-BEFORE-ROUTING PACKET PROCESSING AND METHOD OF OPERATION

TECHNICAL FIELD OF THE INVENTION

The present invention relates generally to massively parallel, distributed architecture routers and, more specifically, to a router that bypasses the Layer 3 routing engines by performing switching directly between Layer 2 modules.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well in situations in which the time required to receive a packet, determine its destination, and forward the packet to the destination is usually smaller than the transmission time on network paths. More recently, however, the packet transmission capabilities of high-bandwidth network paths and the increases in Internet traffic have combined to outpace the processing capacities of conventional routers.

This has led to the development of a new generation of massively parallel, distributed architecture routers. A distributed architecture router typically comprises a large number of route processing modules that are coupled to a high-bandwidth crossbar switch via a plurality of switch fabric modules. Each route processing module has its own routing (or forwarding) table for forwarding data packets via other route processing modules to a destination address.

However, conventional routers send all data packets to the routing engines in the route processing modules. The routing engines use the routing tables to perform a look-up of the destination for each and every data packet to be sent through the switch fabric. Thus, the routing resources are before the switch and all data packets must pass through the routing engines.

Unfortunately, this approach has significant drawbacks. Performing a routing operation on every data packet leads to limitations in the overall throughput of the router. In order to improve performance, conventional routers often implement very expensive, high-speed routing components. Conventional routers also use a greater number of these expensive routing components to boost performance. This also leads to scalability problems that limit the maximum throughput achievable.

Therefore, there is a need in the art for a high-speed router that does not require the computationally intensive routing resources associated with conventional routers. In particular, there is a need for a high-speed router that does not perform a routing operation on each and every data packet that the router receives.

SUMMARY OF THE INVENTION

The present invention provides a fast, efficient, low cost means of routing Layer 3 data packets that are traveling over Layer 2 routes in a distributed architecture router. To use the routing resources efficiently and thereby reduce costs, the present invention bypasses the routing engines in the route processing modules whenever possible. In this manner, a router according to the principles of the present invention switches data packets in hardware more often and routes data packets in software less often. When routing is required, the present invention load balances among many route processing modules.

To address the above-discussed deficiencies of the prior art, it is a primary object of the present invention to provide an improved router for use in a telecommunication network. According to an advantageous embodiment of the present invention, the router comprises: i) a switch fabric; and ii) N Layer 2 modules coupled by the switch fabric, each of the N Layer 2 modules capable of receiving data packets in Layer 2 frames and forwarding the received data packets using Layer 2 addresses associated with the Layer 2 frames, wherein a first one of the Layer 2 modules comprises a Layer 3 routing engine capable of forwarding a first received data packet through the switch fabric directly to a second one of the Layer 2 modules using a Layer 3 address associated with the first received data packet if the first Layer 2 module does not recognize a Layer 2 address associated with the first received data packet.

According to one embodiment of the present invention, the Layer 3 routing engine comprises a forwarding table comprising a plurality of aggregated Layer 3 addresses.

According to another embodiment of the present invention, the router further comprises R route processing modules coupled to the switch fabric, wherein the first Layer 2 module transmits the first received data packet to a first one of the R route processing modules if the Layer 3 routing engine determines that the forwarding table does not contain the Layer 3 address associated with the first received data packet.

According to still another embodiment of the present invention, the switch fabric transmits the first received data packet to the first route processing module by selecting the first route processing module using a load distribution algorithm.

According to yet another embodiment of the present invention, the load distribution algorithm is a round-robin algorithm.

According to a further embodiment of the present invention, the Layer 2 frames are Ethernet frames.

According to a still further embodiment of the present invention, the Layer 3 data packets are Internet protocol (IP) data packets.

According to a yet further embodiment of the present invention, the switch fabric is a Layer 2 switch.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
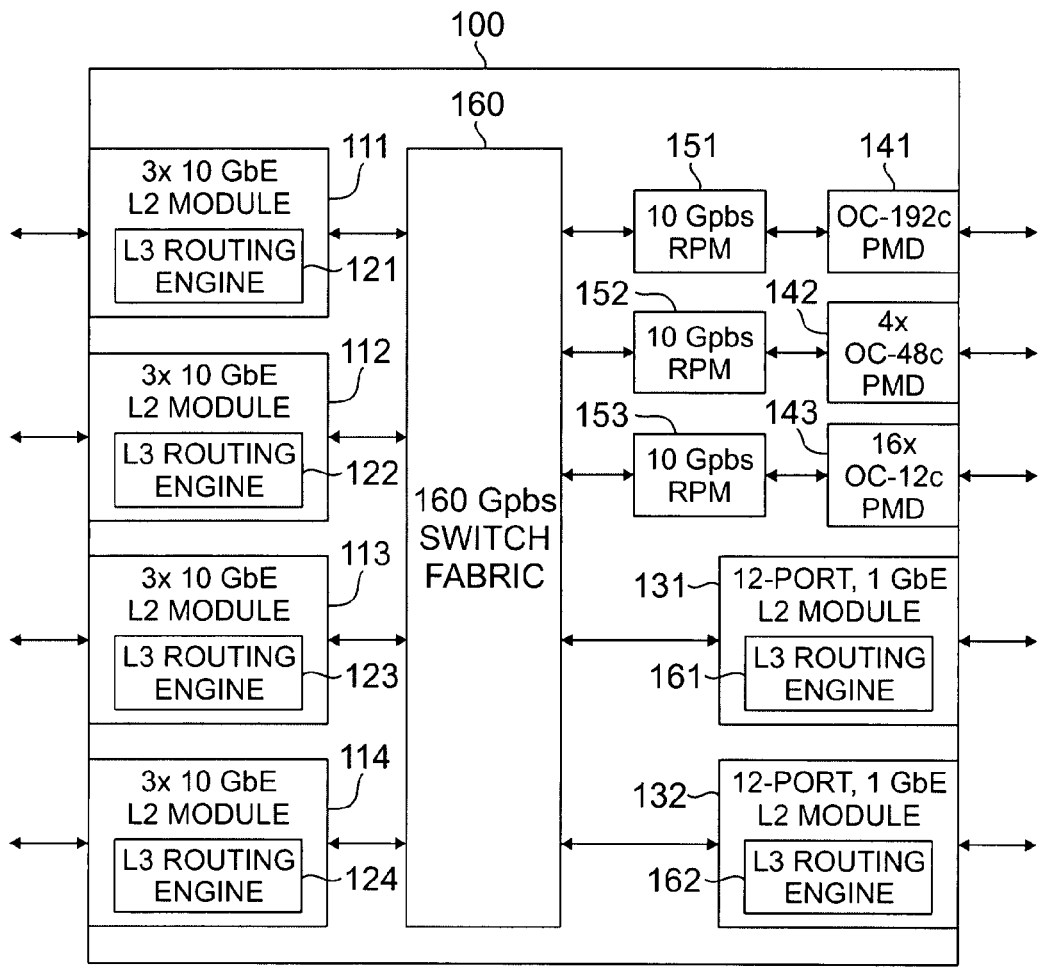
FIG. 1 illustrates an exemplary router having a collapsed-backbone architecture according to the principles of the present invention.
Figure 2:
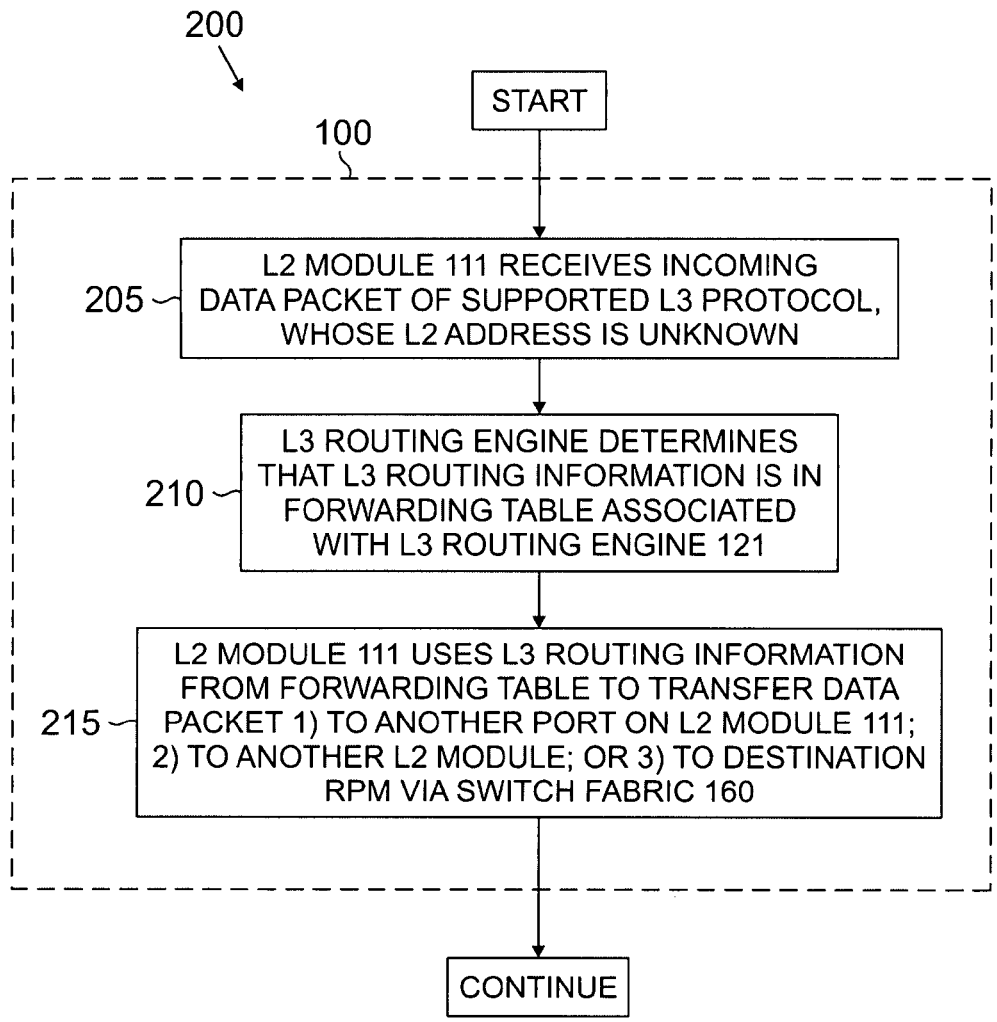
FIG. 2 is a flow diagram illustrating the routing of Layer 3 data packets that are found in the routing tables of the Layer 2 modules according to an exemplary embodiment of the present invention.
Figure 3:
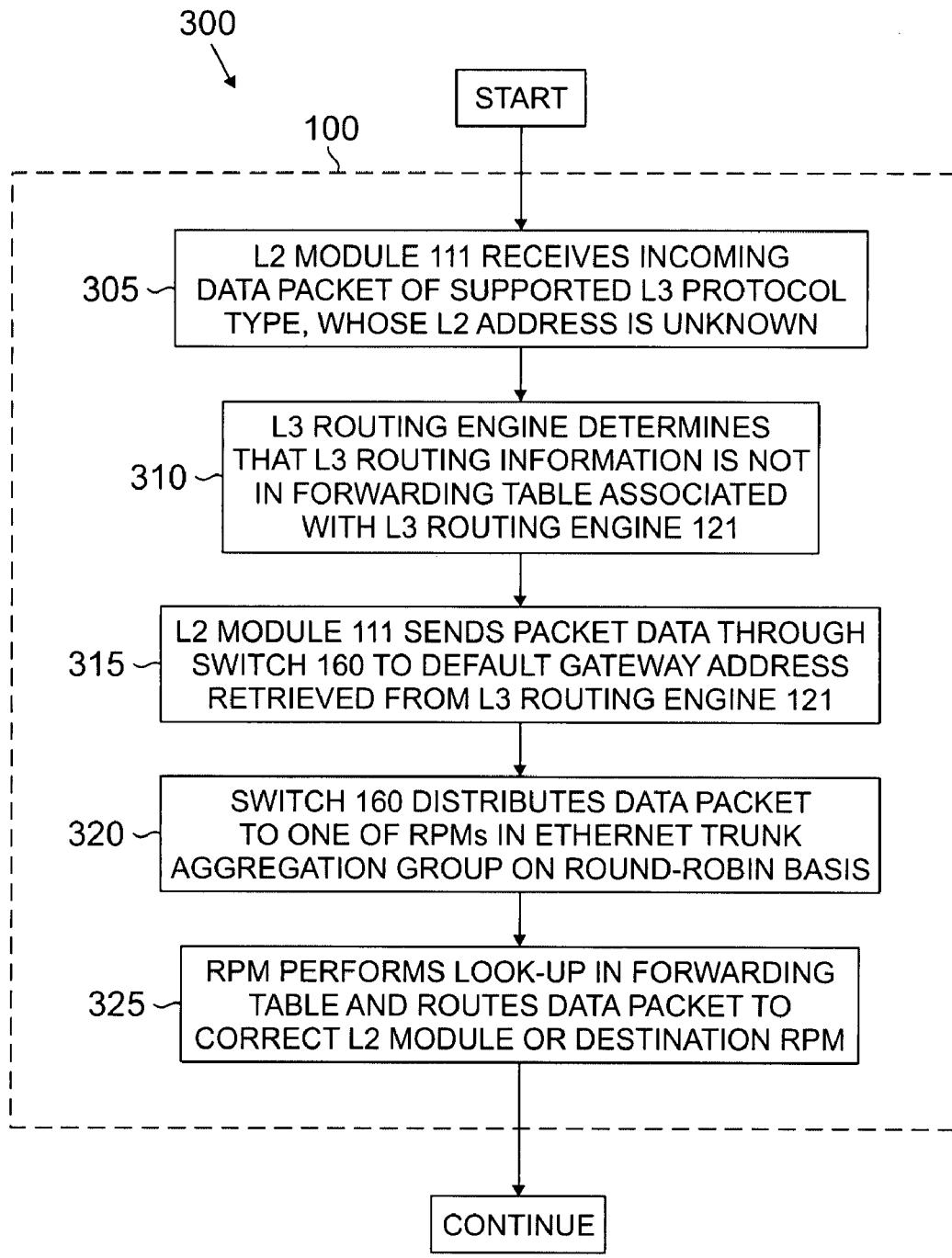
FIG. 3 is a flow diagram illustrating the two-step routing of Layer 3 data packets that are not found in the routing tables of the Layer 2 modules according to an exemplary embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged distributed architecture router.

FIG. 1 illustrates selected portions of exemplary router 100, which has a collapsed-backbone architecture according to the principles of the present invention. Router 100 comprises N Layer 2 (L2) modules, including exemplary L2 modules 111-114 and exemplary L2 modules 131 and 132, M physical media device (PMD) modules, including exemplary PMD modules 141-143, and R route processing modules, including exemplary route processing modules 151-153. Router 100 further comprises switch fabric 160. Also, exemplary Layer 2 (L2) modules 111-114 comprise Layer 3 (L3) routing engines 121-124, respectively, and exemplary Layer 2 (L2) modules 131 and 132 comprise Layer 3 (L3) routing engines 161 and 162, respectively.

According to the exemplary embodiment, each one of L2 modules 111-114 comprises three 10-gigabit Ethernet (3×10 GbE) ports and each one of L2 modules 131 and 132 comprises twelve 1-gigabit Ethernet (12×1 GbE) ports. Also, in the exemplary embodiment, PMD module 141 comprises an OC-192c fiber optic link, PMD module 142 comprises four OC-48c fiber optic links, and PMD module 143 comprises 16 OC-12c fiber optic links. Route processing module 151 is a 10-gigabit per second (10 Gbps) device that transfers data packets bi-directionally between PMD module 141 and switch fabric 160. Route processing module 152 is a 10 Gbps device that transfers data packets bi-directionally between PMD module 142 and switch fabric 160. Route processing module 153 is a 10-gigabit per second (10 Gbps) device that transfers data packets bi-directionally between PMD module 143 and switch fabric 160.

Switch fabric 160 operates at 160 gigabits per second (Gbps). Switch fabric 160 may receive data packets from any one of Layer 2 modules 111-114, L2 modules 131 and 132, and route processing modules 151-153 and is capable of routing the received data packet to any one of Layer 2 modules 111-114, Layer 2 modules 131 and 132, and route processing modules 151-153.

According to the principles of the present invention, router 100 operates under a "switch-if-you-can, route-if-you-must" approach. As FIG. 1 illustrates, router 100 is a distributed architecture with a plurality of Layer 2 modules (L2Ms) and a plurality of route processor modules (RPMs) that are interconnected by switch fabric 160. The terms "Layer 2" and "Layer 3" refer to the OSI model and are well known to those skilled in the art. L2 modules 111-114 and 131-132 receive incoming data packets organized in Layer 2 frames (e.g., Ethernet frames) that are identified by a Layer 2 address (e.g., a MAC address). The Ethernet frames may contain Layer 3 packets (e.g., Internet protocol (IP) packets) that are identified by a Layer 3 address (e.g., IP address).

As is well known, a router learns the location of a MAC address from received Address Resolution Protocol (ARP) replies and from the source address field of received data packets. Once the destination is learned, the L2 modules forward new data packets identified by the learned MAC address to the destination device associated with the MAC address. However, even if a router does not know the destination device for a particular L2 address (e.g., MAC address), it is entirely possible that the router may be able to use the L3 address information inside the L2 frames to forward the data packet to the final destination device. This is because the router also learns IP address information from various routing protocols, such as RIP, BGP, OSPF, and the like. In conventional routers, an L2 module sends data packets to a route processing module, which performs a look-up using the L3 addresses. As explained above, however, this is a time-consuming software process that reduces the throughput of a conventional router.

The present invention avoids the time delays associated with the route processing modules by using the limited routing capabilities of the L3 routing engines in the L2 modules. For example, Layer 3 (L3) routing engines 121-124 provide Layer 2 (L2) modules 111-114 with limited forwarding (or routing) tables containing aggregated L3 address prefixes. The L3 prefix (or IP prefix) aggregation is done to allow many of the IP routes to be handled directly by the L2 module. These data packets are then switched through switch fabric 160 directly to the L2 module or route processing module whose ports are on the route to the destination device.

However, the high compression prefix aggregation leads to some error cases. These error cases are handled by route processing modules 151-153 in a two-step routing process. Also, the route-processing load is distributed on a round-robin basis to a plurality of route processing modules that form an aggregated Ethernet trunk group. Load balancing among route processing modules 151-153 is handled easily by mechanisms built into switch fabric 160. Thus, the present invention provides a unique collapsed-backbone architecture, wherein the switching operation occurs before the routing operation (i.e., data packets are switched in hardware, if possible, and are routed otherwise).

Router 100 reduces the load on route processor modules 151-153 by switching (rather than routing) as much traffic as possible. When it becomes necessary to route data packets, the present invention provides a simple load sharing mechanism for routing IP packets. According to an advantageous embodiment of the present invention, router 100 is a standard Layer (L2) switch with full IEEE 802.1p/q VLAN capability, as well as being a conventional Internet protocol (IP) router. L2 modules 111-114, L2 modules 131 and 132, and switch fabric 160 use standard Layer 2 parts. As noted above, each one of L2 modules 111-114, 131 and 132 has a limited amount of Layer 3 (L3) routing capabilities provided by one of L3 routing engines 121-124. Each one of L3 routing engines 121-124, 161 and 162 supports, for example, 4096 IP routes. A draconian prefix aggregation method is used that provides high levels of aggregation, but is subject to errors. However, route processing modules 151-153 handle the aggregation error cases through a two-step routing process, as described below in greater detail. This approach leads to very high-speed routing, since large numbers of L3 data packets never reach the route processing modules 151-153.

FIG. 2 depicts flow diagram 200, which illustrates the routing of Layer 3 data packets that are found in the routing tables of Layer 2 modules 111-114 according to an exemplary embodiment of the present invention. Initially, a Layer 2 module (e.g., L2 module 111) receives an incoming data packet from an external source (process step 205). If the L2 address is known, L2 module 111 simply switches the data packet to an outbound L2 module or route processing module (RPM) according to conventional techniques. However, if the L2 address is unknown, L2 module 111 checks the protocol type. If it is not a supported protocol type, then the L2 frame is handled as unknown frames are handled by the L2 protocols. For Ethernet, as with all known L2 protocols, the frame is flooded to all ports except the port on which it arrived, using standard Ethernet processing. If it is a supported L3 protocol type, L2 module 111 transfers the received data packet to L3 routing engine 121, which determines that the required L3 routing information is in the forwarding (or routing) table associated with L3 routing engine 121 (process step 210). Next, L2 module 111 uses the L3 routing information from forwarding table to transfer the received data packet to another port on L2 module 111, to another L2 module, or to a route processing module via switch fabric 160 (process step 215).

Thus, L3 data packets that are capable of being forwarded using the aggregated IP addresses in the limited L3 routing tables in the L2 modules are switched directly between ports on the L2 modules or route processing modules. If the packet destination is another port on the same L2 module, the data packet is sent directly out the port and if the packet destination is a port on another L2 module or a port on a route processing module, the data packet is sent directly to the other L2 module or route processing module through switch fabric 160. The data packets associated with L2 module ports are never sent to route processing modules 151-153 for forwarding using the extensive forwarding tables in route processing modules 151-153.

FIG. 3 depicts flow diagram 300, which illustrates the two-step routing of Layer 3 data packets that are not found in the routing tables of Layer 2 modules 111-114 according to an exemplary embodiment of the present invention. Initially, L2 module 111 receives incoming data packet (processing step 305). If the L2 address is known, L2 module 111 simply switches the data packet to an outbound L2 module or route processing module according to conventional techniques. However, if the L2 address is unknown, L2 module 111 checks the packet type and, if it is a supported packet type, transfers the received data packet to L3 routing engine 121, which determines that the L3 routing information is not in the forwarding table associated with L3 routing engine 121 (processing step 310). L2 module 111 then sends the data packet through switch 160 using the L2 address of a default gateway retrieved from L3 routing engine 121 (processing step 315). Typically, this the MAC address of an Ethernet trunk group. Switch 160 distributes the data packet using a round-robin algorithm to one of route processing modules 151-153, which form the Ethernet trunk aggregation group (processing step 320). The route processing module then performs a look-up in its forwarding table and routes the data packet to the correct L2 module or route processing module (processing step 325).

The collapsed backbone architecture of router 100 conserves routing resources by switching as much traffic as possible in hardware. This conservation of routing resources leads to a lower cost router for the level of performance provided. In addition, the distribution of as much of the routing as possible to the L2 modules allows higher throughput to be achieved and results in a high level of scalability. Even when routing is necessary, routing resources are used efficiently through a load balancing mechanism. This efficient use of routing resources also reduces cost.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a telecommunication network, a router comprising:
    a switch fabric; and
    at least two Layer 2 modules coupled by said switch fabric, each of said at least two Layer 2 modules operable to receive data packets in Layer 2 frames and forward said received data packets using Layer 2 addresses associated with said Layer 2 frames, wherein a first one of said Layer 2 modules comprises a Layer 3 routing engine for forwarding a first received data packet through said switch fabric directly to a second one of said Layer 2 modules using a Layer 3 address associated with said first received data packet if said first Layer 2 module does not recognize a Layer 2 address associated with said first received data packet and wherein said Layer 3 routing engine comprises a forwarding table comprising a plurality of aggregated Layer 3 addresses, wherein if the Layer 3 routing engine cannot forward the data packet, the Layer 2 engine will inspect the data packet and forward the data packet according to Layer 2 protocols.

2. The router as set forth in claim 1 further comprising at least two route processing modules coupled to said switch fabric, wherein said first Layer 2 module transmits said first received data packet to a first one of said at least two route processing modules if said Layer 3 routing engine determines that said forwarding table does not contain said Layer 3 address associated with said first received data packet.

3. The router as set forth in claim 2 wherein said switch fabric transmits said first received data packet to said first route processing module by selecting said first route processing module using a load distribution algorithm.

4. The router as set forth in claim 3 wherein said load distribution algorithm is a round-robin algorithm.

5. The router as set forth in claim 2 wherein said Layer 2 frames are Ethernet frames.

6. The router as set forth in claim 2 wherein said Layer 3 data packets are Internet protocol (IP) data packets.

7. The router as set forth in claim 1 wherein said switch fabric is a Layer 2 switch.

8. A telecommunication network comprising a plurality of routers, each of said routers comprising:
    a switch fabric; and
    at least two Layer 2 modules coupled by said switch fabric, each of said at least two Layer 2 modules operable to receive data packets in Layer 2 frames and forward said received data packets using Layer 2 addresses associated with said Layer 2 frames, wherein a first one of said Layer 2 modules comprises a Layer 3 routing engine for forwarding a first received data packet through said switch fabric directly to a second one of said Layer 2 modules using a Layer 3 address associated with said first received data packet if said first Layer 2 module does not recognize a Layer 2 address associated with said first received data packet and wherein said Layer 3 routing engine comprises a forwarding table comprising a plurality of aggregated Layer 3 addresses wherein if the Layer 3 routing engine cannot forward the data packet, the Layer 2 engine will inspect the data packet and forward the data packet according to Layer 2 protocols.

9. The telecommunication network as set forth in claim 8 wherein said each router further comprises at least two route processing modules coupled to said switch fabric, wherein said first Layer 2 module transmits said first received data packet to a first one of said at least two route processing modules if said Layer 3 routing engine determines that said forwarding table does not contain said Layer 3 address associated with said first received data packet.

10. The telecommunication network as set forth in claim 9 wherein said switch fabric transmits said first received data packet to said first route processing module by selecting said first route processing module using a load distribution algorithm.

11. The telecommunication network as set forth in claim 10 wherein said load distribution algorithm is a round-robin algorithm.

12. The telecommunication network as set forth in claim 9 wherein said Layer 2 frames are Ethernet frames.

13. The telecommunication network as set forth in claim 9 wherein said Layer 3 data packets are Internet protocol (IP) data packets.

14. The telecommunication network as set forth in claim 8 wherein said switch fabric is a Layer 2 switch.

15. For use in a router comprising: i) a switch fabric; and (ii) at least two Layer 2 modules coupled by the switch fabric, wherein each of the at least two Layer 2 modules receives data packets in Layer 2 frames and forwards the received data packets using Layer 2 addresses associated with the Layer 2 frames, a method of routing the data packets in the router comprising the steps of:

receiving a first data packet in a first Layer 2 module;

determining if the first Layer 2 module recognizes a Layer 2 address associated with the first received data packet; and if the first Layer 2 module does not recognize the Layer 2 address associated with the first received data packet, using a Layer 3 routing engine associated with the first Layer 2 module to forward the first received data packet through the switch fabric directly to a second one of the Layer 2 modules and wherein the Layer 3 routing engine uses a Layer 3 address associated with the first received data packet to forward the first received data packet wherein if the Layer 3 routing engine cannot forward the data packet, the Layer 2 engine will inspect the data packet and forward the data packet according to Layer 2 protocols.

16. The method as set forth in claim 15 further comprising the step of transmitting the first received data packet from the first Layer 2 module to a first one of at least two route processing modules through the switch fabric if the Layer 3 routing engine determines that a forwarding table associated with the Layer 3 routing engine does not contain the Layer 3 address associated with the first received data packet.

17. The method as set forth in claim 16 wherein the switch fabric transmits the first received data packet to the first route processing module by selecting the first route processing module using a load distribution algorithm.

18. The method as set forth in claim 17 wherein the load distribution algorithm is a round-robin algorithm.

19. The method as set forth in claim 16 wherein the Layer 2 frames are Ethernet frames.

20. The method as set forth in claim 16 wherein the Layer 3 data packets are Internet protocol (IP) data packets.

21. The method as set forth in claim 15 wherein the switch fabric is a Layer 2 switch.

* * * * *